July 25, 1950     G. NAHMAN     2,516,140
ELECTROMAGNETIC STRUCTURE

Filed Dec. 14, 1944     2 Sheets—Sheet 1

INVENTOR
Gustave Nahman
BY
Dean Fairbank & Hirsch
ATTORNEYS

July 25, 1950 G. NAHMAN 2,516,140
ELECTROMAGNETIC STRUCTURE
Filed Dec. 14, 1944 2 Sheets-Sheet 2

INVENTOR
*Gustave Nahman*
BY
*Dean Fairbank & Hirsch*
ATTORNEYS

Patented July 25, 1950

2,516,140

UNITED STATES PATENT OFFICE 2,516,140

ELECTROMAGNETIC STRUCTURE

Gustave Nahman, Englewood, N. J.

Application December 14, 1944, Serial No. 568,098

1 Claim. (Cl. 175—21)

The present invention relates to electro-magnetic frames, fields, cores and the like of the type used in electric transformers, motors, relays, switches, and other electro-magnetic devices.

While laminated cylindrical iron structures theoretically provide the most efficient magnetomotive circuits, their use has imposed obstacles due to the cost and difficulty of assembling the required multiplicity of such laminations radially of the cylinder, bearing in mind that progressively greater thickness of laminations is required from the core to the periphery. This difficulty of assembly accounts to considerable extent for the use by the art of rectangular magnetic structures, since the laminations may thus be easily assembled in superposed relation.

It is an object of the present invention to provide a simple, expeditious and inexpensive procedure for assembling laminations of uniform thickness in generally radial relation for producing a cylindrical magnetic structure that combines the advantages of such cylindrical form with the economy of assembly heretofore attained only by the use of rectangular structures.

Another object is to provide a magnetic core structure made up of laminations in which magnetic material is present throughout the volume of the structure so that the reluctance is low with the elimination of the multiplicity of minor empty gaps that otherwise occur.

Figure 1:
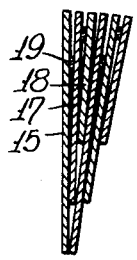
Figure 4:
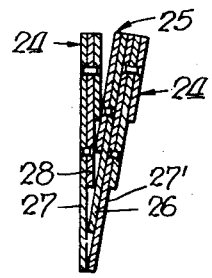
Figure 5:
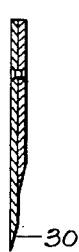
Figure 6:
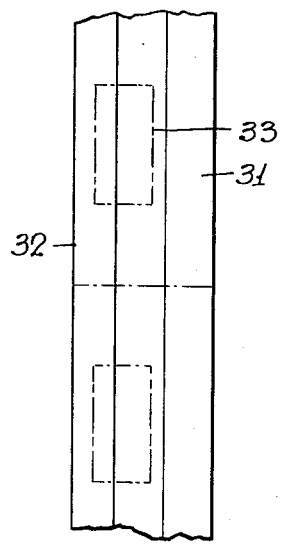
Figure 7:
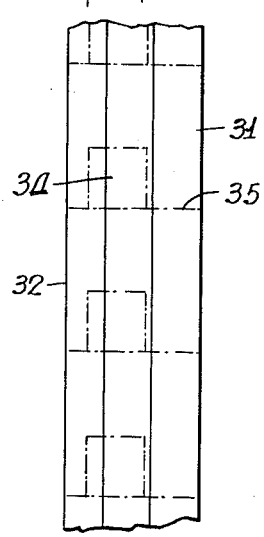
Figure 8:
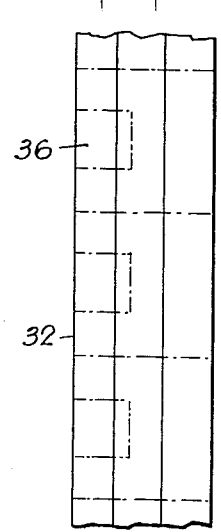
Figure 9:
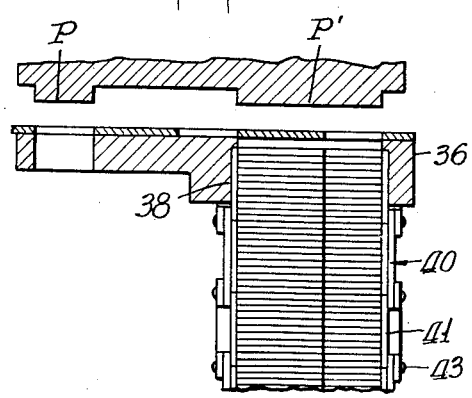
Figure 10:
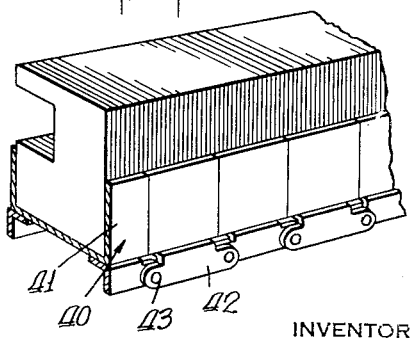
Figure 11:
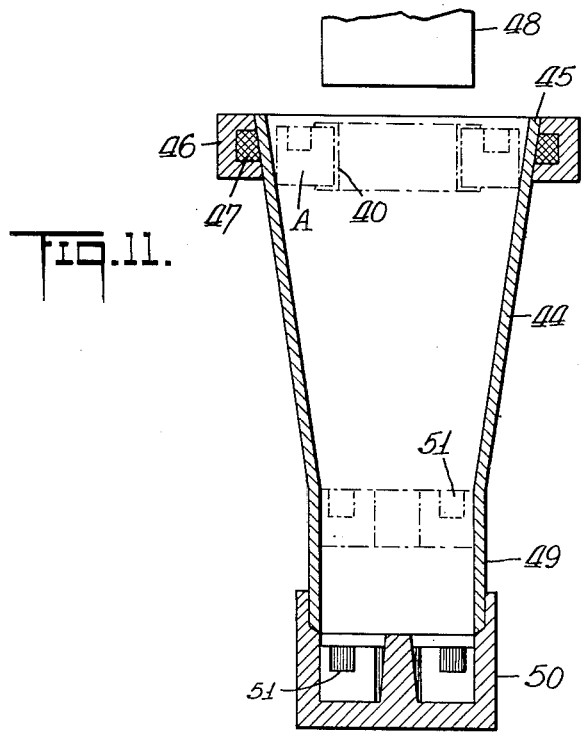
Figure 12:
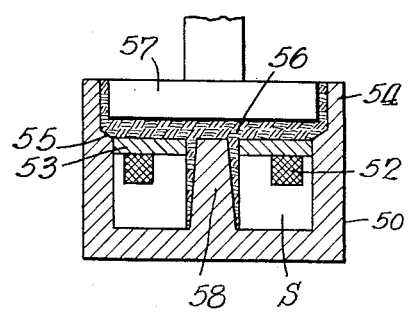

In the accompanying drawings, in which are shown one or more of various possible embodiments of the several features of the invention, Fig. 1 is a view in transverse cross-section of one embodiment of the generally sector shaped sub-assembly components of the cylindrical structure, Figs. 2, 3, 4 and 5 are views similar to Fig. 1 of other embodiments thereof, Fig. 6 is a plan view showing one embodiment of composite strip and illustrating the sub-division thereof into the laminated sub-assembly of the magnetic structure, Figs. 7 and 8 are alternative embodiments thereof, Fig. 9 is a perspective view showing the method of stamping the laminations from a sheet and the method of collecting the same, Fig. 10 is a perspective view of the sectional holding band for the laminated sectors, Fig. 11 is a view in longitudinal cross-section showing the apparatus for and method of assembly of the magnetic structure, and Fig. 12 is a view in longitudinal cross-section showing the impregnation of the assembly with magnetic plastic material.

Referring now to the drawings, there is shown in Fig. 1 a fragmentary view of a generally cylindrical magnetic structure made up of sector shaped sub-assemblies. Each sub-assembly is illustratively shown as having three laminations of uniform thickness all extending inward from the outer periphery of the structure and of progressively stepped radial length, lamination 15 extending to the inner hollow core, lamination 17 being somewhat shorter and lamination 18 being the shortest. Accordingly there is but a single lamination for each sector at the core, a double lamination at the mid section and a triple lamination at the outer periphery. The laminations are held together by spot soldering 19 in the embodiment of Fig. 1.

Figure 2:

The sector sub-assembly in the embodiment of Fig. 2 is similar to that of Fig. 1, except that magnetic rivets 20, preferably flush with the outer faces of the sub-assembly serve to clamp the parts together in an assembled relation.

Figure 3:
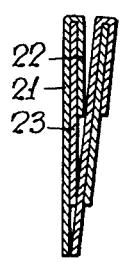

The sub-assembly embodiment of Fig. 3 involves but two laminations, the longer lamination 21 having a reversely bent outer edge turned in as at 22, firmly to clamp the shorter lamination 23 in place, so that a triple stepped laminated structure is obtained, similar to that of Figs. 1 and 2, but without the use of solder or rivet fastening means.

In the embodiment of Fig. 4, two types of sector-shaped sub-assemblies are disposed in alternate relation; one set 24 is of the three-ply type of either Figs. 1, 2 and 3, illustratively shown as of the type of Fig. 2, and the intervening set 25 is of the two-ply type. However, the stepped side of set 25 faces the stepped side of a three-ply set 24 and the steps of such two sets interfit as shown. The longer ply 26 of the two-ply set is of length intermediate the two longer plies 27 and 28 of the three-ply set and in face-to-face contact with the longest ply 27' of the adjacent three-ply section. A similar relation exists with respect to the shorter ply of set 25 and the associated plies of said set 24. It will thus be seen that the air-gaps between laminations of the wider sector made up of three of the sub-assemblies, including two three-ply and one two-ply element are relatively small.

In the embodiment of Fig. 5, the plies are compressed for bevel shaped inner edges at 30 which arrangement also contributes to closer contiguity of the sub-assemblies and reduces the empty space therebetween. Preferably the bevel arrangement of Fig. 5 is used in each of the embodiments of Figs. 1, 2, 3 and 4 as its use there reduces the size of the gaps which are shown exaggerated in size.

In Figs. 6, 7 and 8 is shown an elongated strip of metal 31 which may be of any of the embodiments previously described, stepped for maximum thickness at longitudinal edge 32 and for single ply at the opposite longitudinal edge. Of course each lamination of the strip is coated with suitable insulating varnish on one face. Strip 31 is to be stamped into individual rectangular sub-assemblies each to have material removed therefrom by stamping preferably a rectangular blank therefrom to afford an opening or gap for the electro-magnetic coil to be associated with the magnetic structure.

In the embodiment of Fig. 6, the rectangular gap 33 formed by said blanking operation is in the interior; in Fig. 7 it is shown at 34 at one transverse edge 35 of the segment, and in Fig. 8 at 36 at the outer or thicker longitudinal edge thereof.

Desirably, the stamping is effected as shown in Fig. 9 by feeding the strip along the bed 36 of a punch press, the punch P of which effects the removal of the rectangular blanks in each sequence, and is immediately followed in operation of punch P' which severs the sub-assemblies. In order to collect the sub-assemblies thus formed, in arrangement convenient for assembling them into the generally cylindrical magnet structure to be built therefrom, the punch P' feeds the sub-assemblies into a chute 38, to which is removably attached the channel-shaped flexibly linked band 40 shown in Fig. 10. That band is preferably of length such as to accommodate the number of sector-shaped sub-assemblies needed for the particular magnetic structure to be built. Preferably the linked band comprises a sequence of channel-shaped non-magnetic metal pieces 41 having lugs 42 extending from each right-angular edge thereof, which are hingedly connected by hinge pins 43, so that the whole constitutes a flexible linked band.

Thus, the sub-assembly stampings, properly assembled within the channel of the band 40 may be readily introduced into the assembly former or jig shown in Fig. 11. That assembly jig has a frusto-conical wall 44 of non-magnetic material with a wider mouth 45, into which the flexible band 40 loaded with its multiplicity of sector-shaped sub-assemblies A may be introduced as shown, with the several sub-assemblies extending in spaced relation radially of the funnel. An electro-magnet made up of a core 46 and an associated coil 47 encompasses the outer part of the former 44 and thereby magnetically retains the sub-assemblies in radial position as shown. The carrying band 40 may now readily be removed without displacement of the sub-assemblies. A plunger 48 axially of the frusto-conical assembling former now presses the entire crown of sub-assemblies downward so as to bring the same into close contiguity at the cylindrical lower end 49 of the former at which is disposed in telescoped relation a removable strong walled mold 50 into which the assembly is forced by the plunger, as shown.

In the illustrative embodiment shown, the blanks are of the type shown in Fig. 7, so that in the assembled relation within the mold, they present an annular groove 51 in which is to be accommodated the electro-magnetic coil assembly 52 that has been impregnated according to usual practice.

After introduction of that coil assembly into the structure within the mold 50, following removal of the latter from the jig 44, the armature 53 which may be of construction similar to the laminated structure described is applied and thereupon the entire structure is impregnated to fill its voids with a thermo-setting magnetic plastic that carries iron or other magnetic particles. For this purpose the mold is enlarged in diameter as at 54 at its outer end for a bore larger than that which snugly accommodates the magnetic structure S. The connecting shoulder between the enlarged bore 54 and the magnet cylinder structure carrying bore is desirably beveled at 55 as shown. The magnetic plastic 56 which is usually about two parts of iron or other magnetic powder and one part thermo-setting resin, is introduced within the mold above the cavity that houses the magnetic structure and is pressed into position by piston 57 under hydraulic pressure. In this operation the magnetic plastic liquefies, enters about the center plug 58 of the mold and thence radially outward through the magnet structure to fill all of the interstices thereof and to expel the air therefrom peripherally. After the material has expanded and hardened, the plunger is withdrawn and the magnetic structure is then removed from mold 50. The expanded and hardened plastic not only fills the interstices of the structure but also bonds it into a securely assembled unit which is para magnetic throughout its bulk, without air spaces that detract from the reluctance thereof.

Where the notches are cut in the longitudinal edge of the strip as in Fig. 8, the electro-magnetic coil will of course be lodged in a peripheral groove about the cylindrical core as will be readily understood.

Where the embodiment of Fig. 6 is employed the completed magnetic structure will have an annular hollow therein determined by the openings 33. Such cylindrical structure is of course to be sawed midway between its ends to provide two magnet cores similar to that shown in Fig. 12.

Thus it will be seen that the present invention affords a simple and inexpensive procedure for not only producing the laminations, but for expeditiously assembling them and bonding them into a unitary cylindrical construction of minimum reluctance. There is no need for individual handling of the laminations in the assembly operation. By the method of the present invention the coil carrying groove in the magnetic structure results from the assembly of the previously notched or perforated laminations and there is thus avoided the danger of conductively bonding successive laminations together which would be incurred were the pre-assembled laminated core to have its coil carrying groove machined thereinto.

As many changes could be made in the above construction and method and many apparently widely different embodiments of this invention could be made without departing from the scope of the claim, it is intended that all matter contained in the above description or shown in the accompanying drawings shall be interpreted as illustrative and not in a limiting sense.

Having thus described my invention, what I claim as new and desire to secure by Letters Patent of the United States is:

A laminated, generally cylindrical magnet structure comprising a multiplicity of substantially identical generally radially arranged substantially sector-shaped sub-assemblies, each sub-assembly being made of two laminations of unequal length, the longer lamination being folded over the shorter one at the outer edge thereof, whereby the outer or peripheral portion is three ply and the inner portion is one ply and the intermediate portion is two ply.

GUSTAVE NAHMAN.

REFERENCES CITED

The following references are of record in the file of this patent:

UNITED STATES PATENTS

| Number | Name | Date |
|---|---|---|
| 432,050 | Kammeyer | July 15, 1890 |
| 682,520 | Berry | Sept. 10, 1901 |
| 1,142,034 | Gerding | June 8, 1915 |
| 1,513,972 | Desloge | Nov. 4, 1924 |
| 1,837,142 | Bailey | Dec. 15, 1931 |
| 1,909,491 | Howie | May 16, 1933 |
| 1,962,431 | Daley | June 12, 1934 |
| 2,053,176 | Bourvers | Sept. 1, 1936 |
| 2,142,066 | Eppelsheimer | Dec. 7, 1938 |
| 2,348,003 | Granfield | May 2, 1944 |
| 2,355,137 | Behlmer | Aug. 8, 1944 |
| 2,359,102 | Foster | Sept. 26, 1944 |
| 2,382,857 | Camilli | Aug. 14, 1945 |

FOREIGN PATENTS

| Number | Country | Date |
|---|---|---|
| 482,771 | Great Britain | Apr. 5, 1938 |